(12) United States Patent
Yu et al.

(10) Patent No.: US 11,960,685 B2
(45) Date of Patent: Apr. 16, 2024

(54) XR VIRTUAL TRACKPAD

(71) Applicant: NTT DOCOMO, INC., Tokyo (JP)

(72) Inventors: Young-Cheol Yu, Palo Alto, CA (US); Yuya Tanaka, Palo Alto, CA (US); Yoji Osako, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/119,697

(22) Filed: Mar. 9, 2023

(65) Prior Publication Data
US 2024/0036683 A1 Feb. 1, 2024

Related U.S. Application Data

(60) Provisional application No. 63/393,173, filed on Jul. 28, 2022.

(51) Int. Cl.
| | |
|---|---|
| *G06F 3/042* | (2006.01) |
| *G06F 3/01* | (2006.01) |
| *G06F 3/04845* | (2022.01) |
| *G06F 3/0485* | (2022.01) |
| *G06F 3/0487* | (2013.01) |

(52) U.S. Cl.
CPC ............ *G06F 3/0426* (2013.01); *G06F 3/013* (2013.01); *G06F 3/017* (2013.01); *G06F 3/04845* (2013.01); *G06F 3/0485* (2013.01); *G06F 3/0487* (2013.01); *G06F 2203/04808* (2013.01)

(58) Field of Classification Search
None
See application file for complete search history.

(56) References Cited

U.S. PATENT DOCUMENTS

| 10,042,387 B2 * | 8/2018 | Chen ..................... G06F 3/045 |
| 2022/0253188 A1 * | 8/2022 | Berliner ................ G06F 3/012 |

FOREIGN PATENT DOCUMENTS

CN 102906623 A * 1/2013 ........... G02B 27/017

* cited by examiner

*Primary Examiner* — Duane N Taylor, Jr.
(74) *Attorney, Agent, or Firm* — Womble Bond Dickinson (US) LLP

(57) ABSTRACT

A virtual trackpad and method for using the same are disclosed. In some embodiments, the method comprises: projecting a virtual trackpad on one hand of a user using hand tracking position data from an extend reality (XR) device; detecting, via hand tracking, movements of one or more fingers as the one or more fingers are being moved across the virtual trackpad projected on the one hand; and controlling a user interface (UI) being displayed on a display by the XR device based on the movements of the one or more fingers.

20 Claims, 8 Drawing Sheets

XR VIRTUAL TRACKPAD

PRIORITY

The present application claims the benefit of U.S. Provisional Patent Application No. 63/393,173, filed on Jul. 28, 2022 and entitled "XR Virtual Trackpad", which is incorporated by reference in its entirety.

BACKGROUND

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Various XR environments exist, allowing representations of users to move about and speak with one another. However, the user interface (UI) and user experience (UX) are limited. For example, the user interfaces often rely on hand tracking that doesn't always operate effectively and may even be uncomfortable for users. That is, the user interface for prior art XR devices are typically controlled using hand gestures that are tracked by hand tracking performed by the XR device. However, in such a case, there is no physical feedback.

SUMMARY

The present disclosure is directed to projecting a virtual trackpad on one hand of a user using hand tracking position data from an extend reality (XR) device and using the virtual trackpad to control a user interface (UI), substantially as shown in and/or described in connection with at least one of the Figures, as set forth more completely in the claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
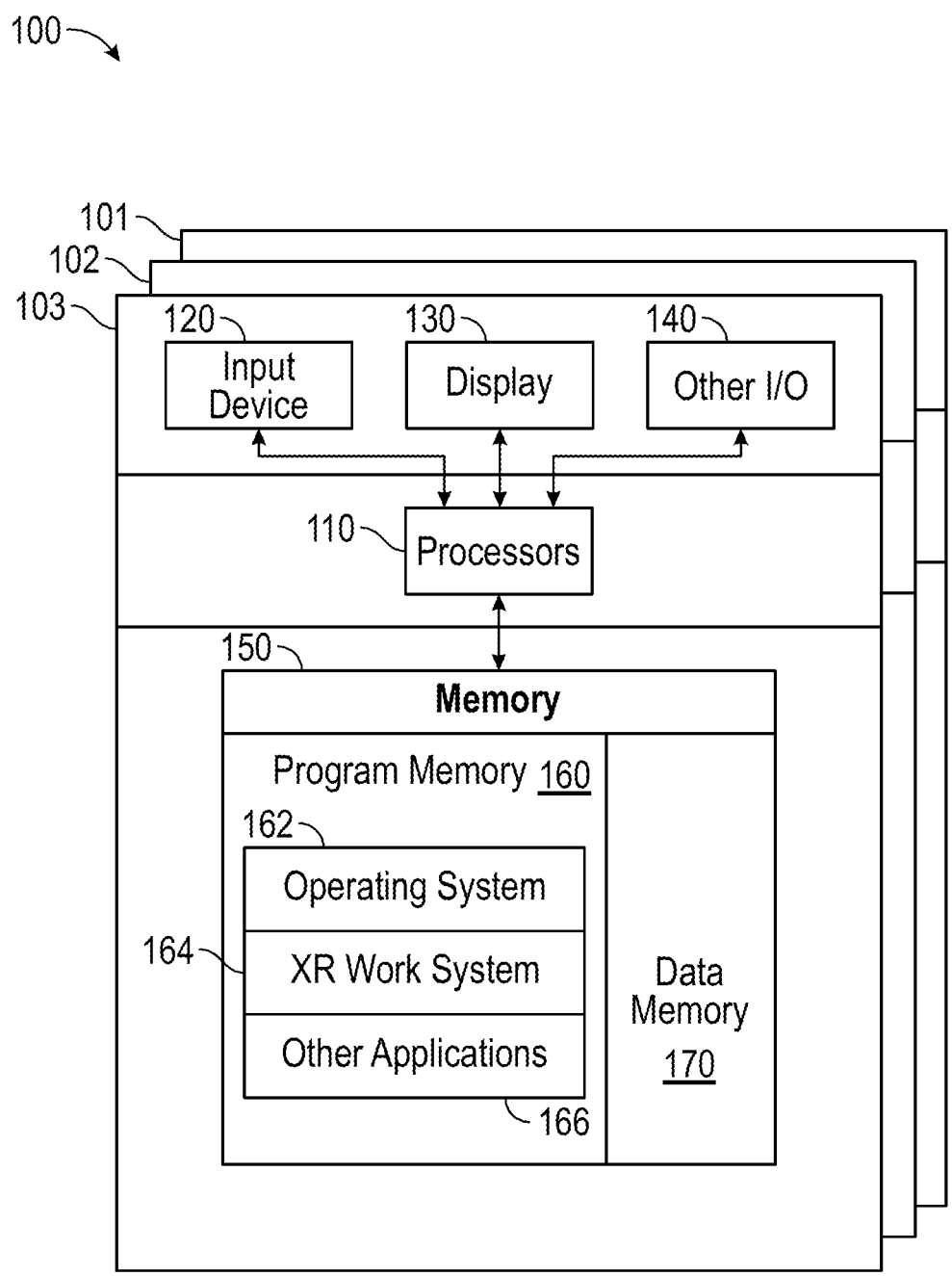
FIG. 1 is a block diagram illustrating an overview of devices on which some implementations of the disclosed technology can operate

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

A virtual trackpad and method for using the same are disclosed. In some embodiments, an extend reality (XR) device projects a virtual trackpad on a hand of a user using, for example, hand tracking position data. Once project, the XR device detects, via hand tracking, movements of one or more fingers as the one or more fingers are being moved across the virtual trackpad projected on the hand. These movement are processed into commands executed in the XR device to control a user interface (UI) being displayed on a display by the XR device. The XR device may be implemented as a head-mounted display (HMD) system, an example of which is described below.

Embodiments of the disclosed technology may include or be implemented in conjunction with an artificial reality, extended reality, or extended reality (collectively "XR"), which is a form of reality that has been adjusted in some manner before presentation to a user, which may include, e.g., virtual reality (VR), augmented reality (AR), mixed reality (MR), hybrid reality, or some combination and/or derivatives thereof. Extended reality content may include completely generated content or generated content combined with captured content (e.g., real-world photographs). Additionally, in some embodiments, extended reality may be associated with applications, products, accessories, services, or some combination thereof, that are, e.g., used to perform activities in an artificial reality. The extended reality system that provides the extended reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real-world. For example, a MR headset could be shaped as a pair of glasses with a pass-through display, which allows light from the real-world to pass-through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can create, administer, and provide interaction modes for an XR environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye or head direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
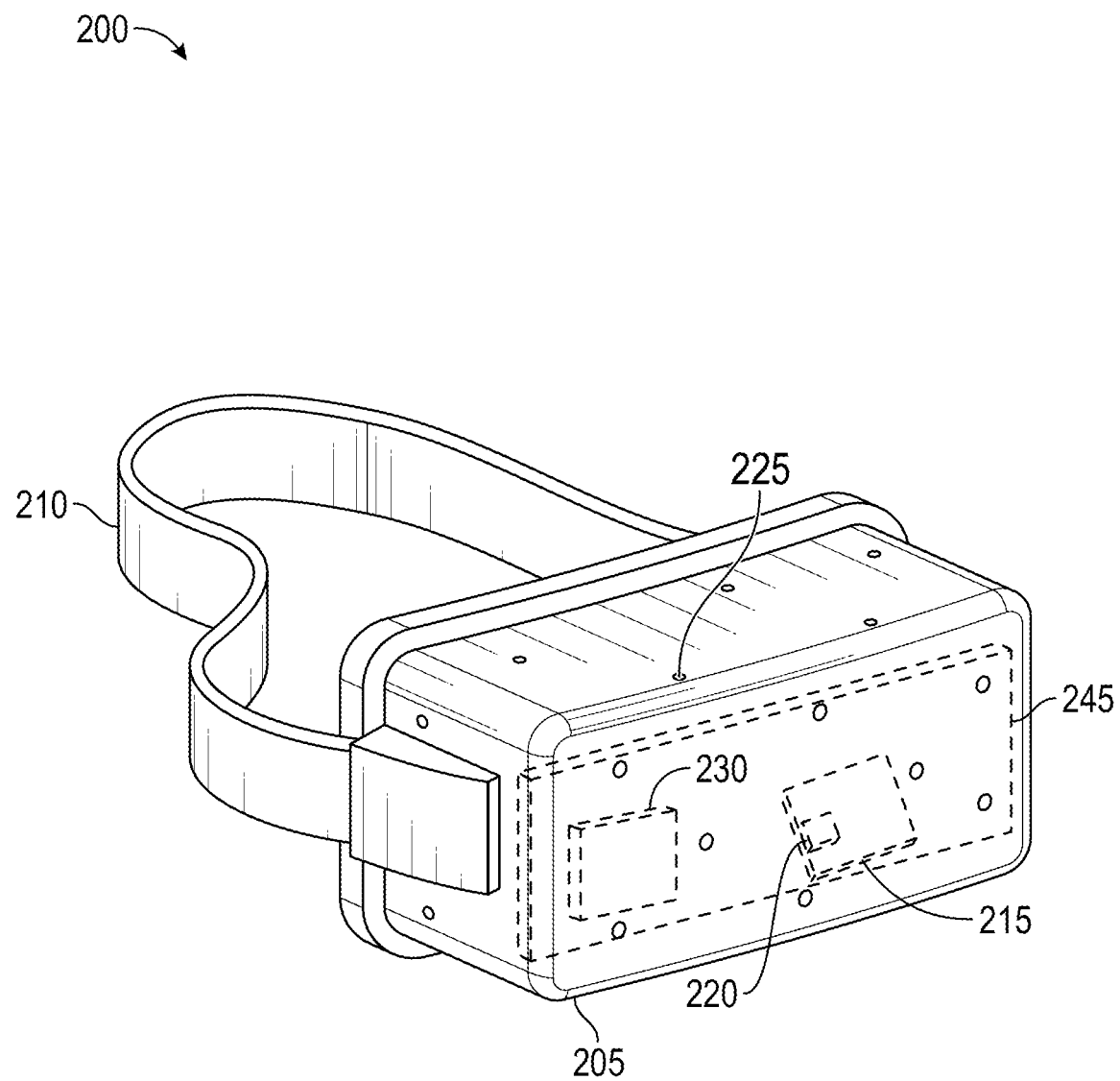
FIG. 2A is a wire diagram of a head-mounted display (HMD) in accordance with some embodiments.

FIG. 2A is a wire diagram of a head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
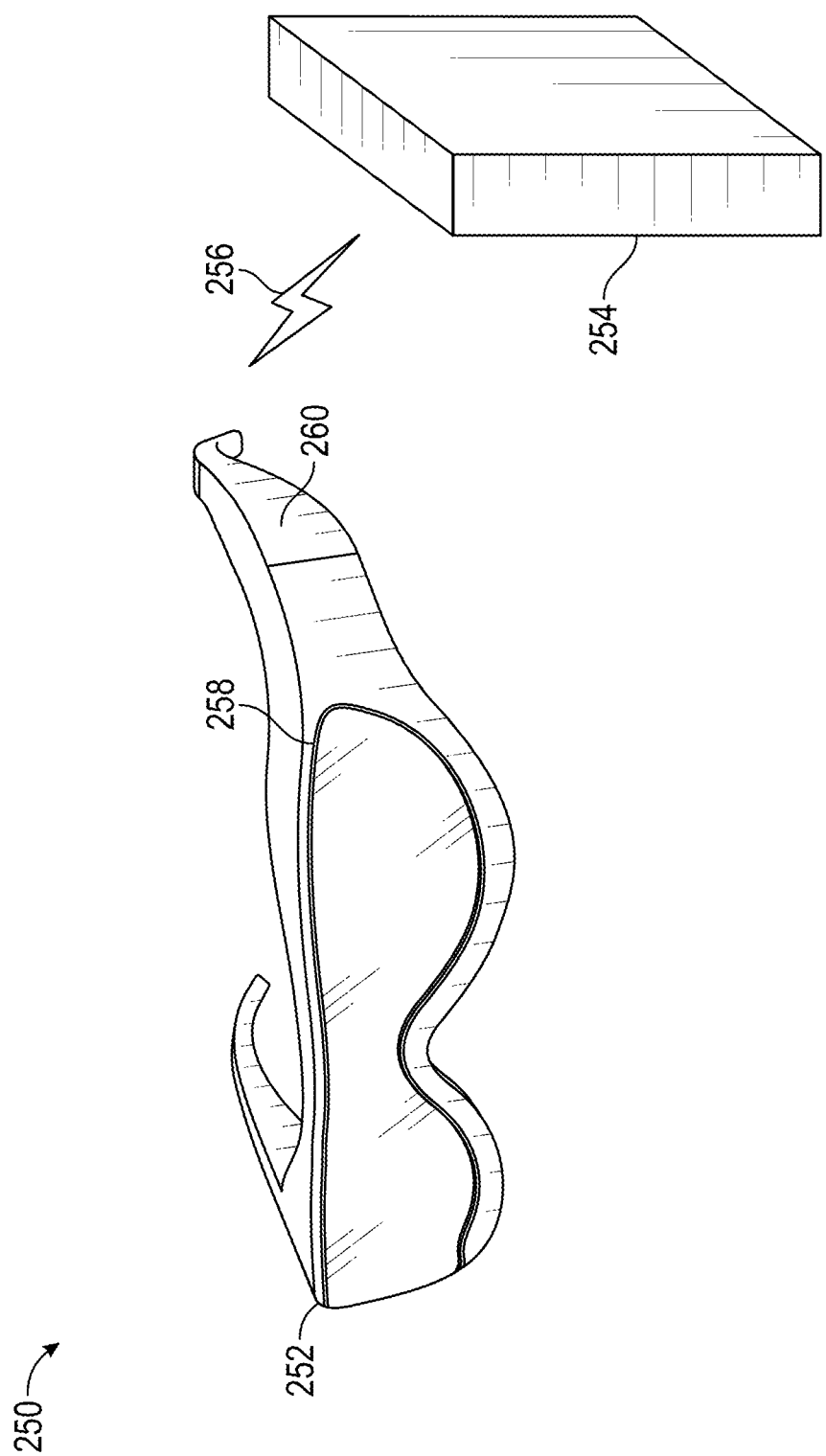
FIG. 2B is a wire diagram of a mixed reality HMD system which includes a mixed reality HMD and a core processing component.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly, to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

In various implementations, the HMD 200 or 250 can also include additional subsystems, such as an eye tracking unit, a head tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

XR Virtual Trackpad

In some embodiments, the user interface to an XR device includes a virtual trackpad. In such a case, the XR device projects a virtual trackpad on the user's palm in the user interface in the XR device. In some embodiment, the virtual trackpad is projected on the center position of the palm using hand tracking position data from XR devices. Using the virtual trackpad, the user can control a curser with a finger (e.g., an index finger) in the same manner as the personal computer or laptop trackpad is utilized. This is advantageous in that the user is able to get physical feedback on their palm when controlling the cursor with their finger. That is, the user can feel the user interface (UI)/user experience (UX) by linking the cursor control to physical feedback.

Figure 3A:
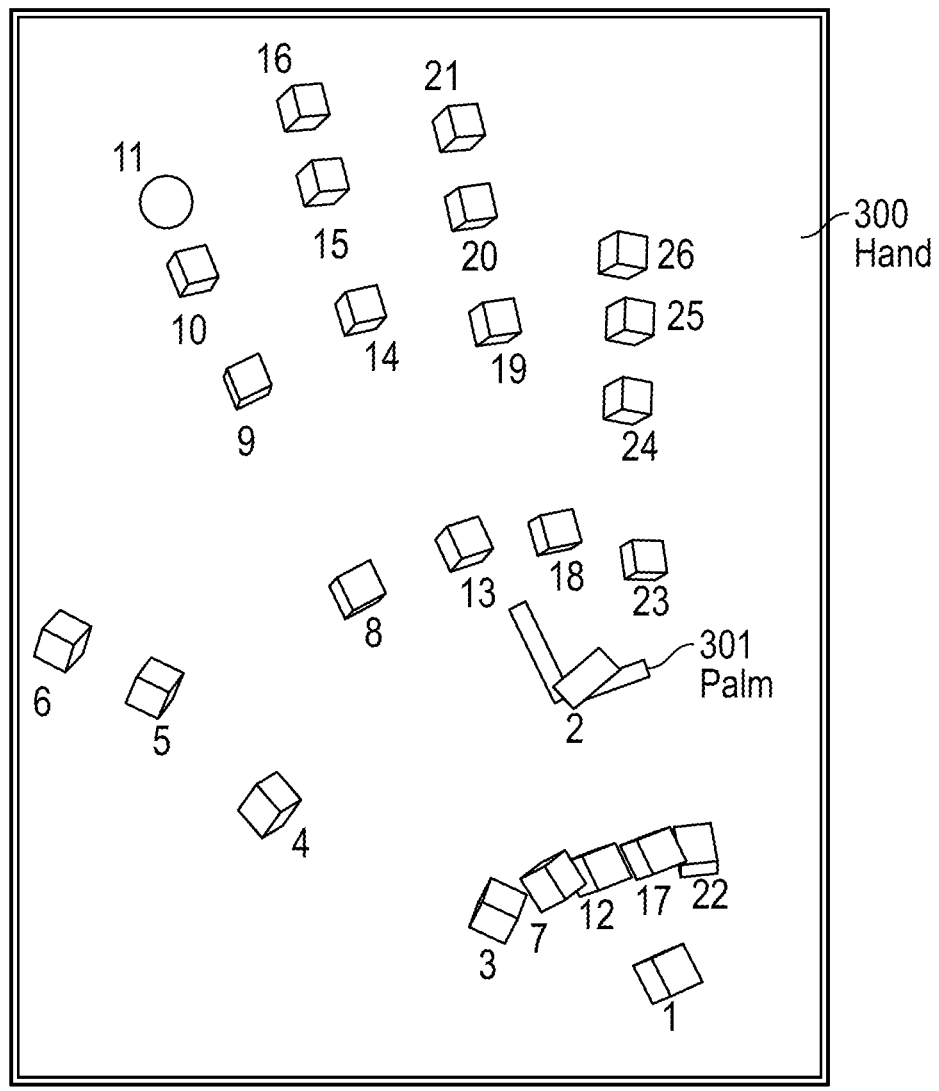
FIGS. 3A and 3B illustrate some embodiments of a virtual trackpad.
Figure 3B:
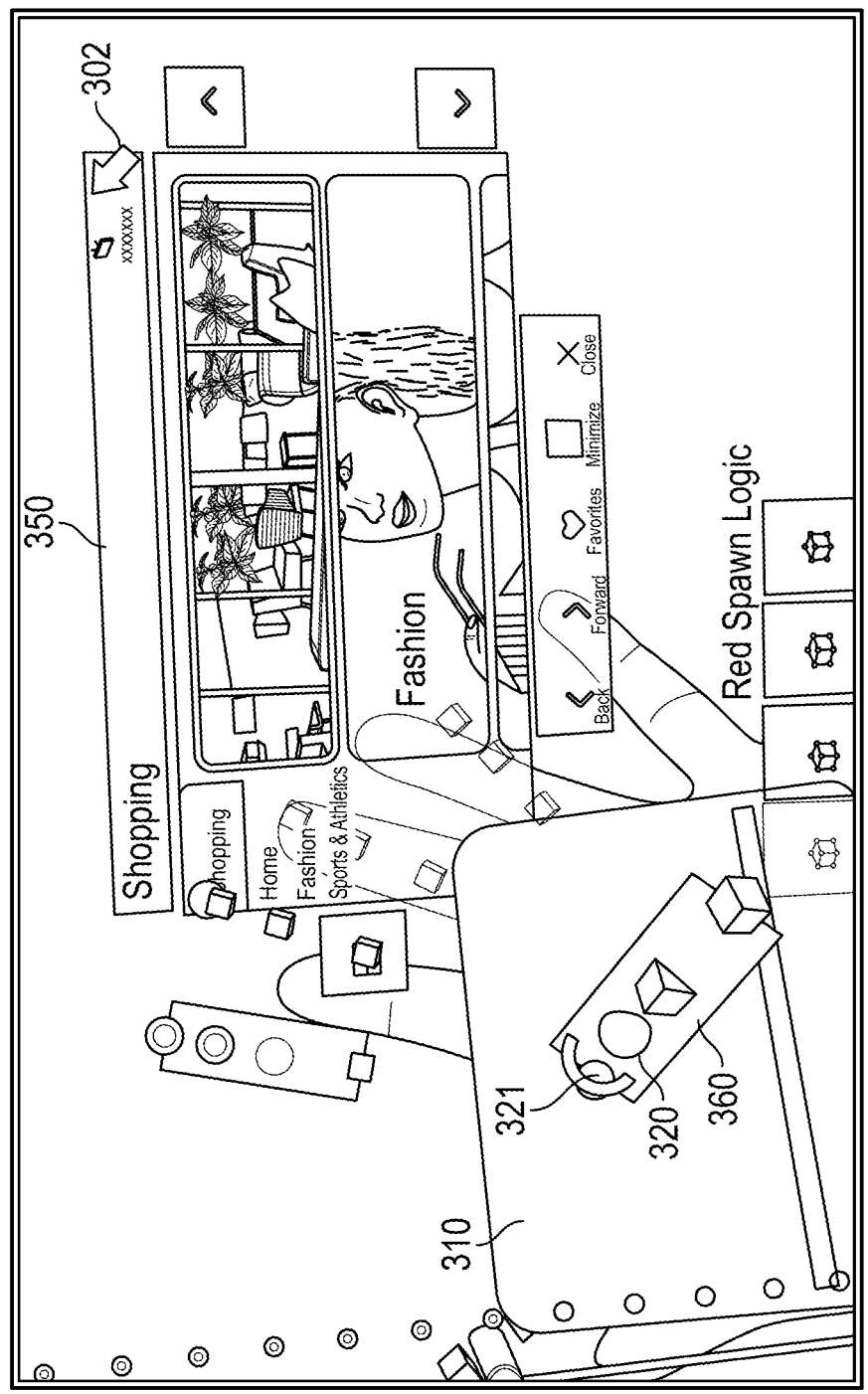

FIGS. 3A and 3B illustrate some embodiments of a virtual trackpad. Referring to FIG. 3A, the XR device. In some embodiments, cameras and/or other sensors in the XR device capture raw data on the position, orientation, and velocity of a user's hand and software in the XR device converts that raw data into a real-time digital model 300 of the hand. FIG. 3A illustrates an example of the model of one of the user's hands. From the model, the XR device identifies the center of a palm 301.

After determining the center of palm 301, the XR device projects a virtual trackpad on the center position of palm 301 using the hand tracking position data. FIG. 3B illustrates an example of virtual trackpad 310. Once virtual trackpad 310 has been projected on a first hand of a user, the user can move one or more figures of their second hand across virtual trackpad 310 and their first hand. Using hand tracking of the one or more fingers of the second hand being moved with respect to virtual trackpad 310, the XR device obtains tracking position data and converts that tracking position data into commands that it executes to control a user interface in a virtual environment being generated and displayed by the XR device. In some embodiments, the commands are related to the movement of a cursor in the user interface, scrolling of a window in the user interface, and/or scaling an object (e.g., a window) in the user interface. The techniques disclosed herein are not limited to these three operations and can be used to generate commands to control other operations related to the user interface and/or virtual environment produced by the XR device.

FIG. 3B illustrates a cursor 302 being moved across a user interface 350 being displayed in a virtual environment according to the movement of the index finger of a user across trackpad 310. Also shown in FIG. 3B are boxes in the virtual environment, such as box 360, representing the user's finger(s) on the trackpad. Each box includes a dot, such as dot 320 representing the end point of the user's finger being moved across trackpad 310. The user interface also includes a number of dots, such dot 321, that indicate a collision detection area. The collision detection area dots can be in a different color (and/or shape) than the dots representing the end points of the user's finger. Each collision detection area is an area in which the user is able to select, with the cursor, a portion (e.g., an object or graphical user interface (GUI) element (e.g., menu option, etc.)) being displayed in the user interface. For example, as the index finger of one hand of a user is moved along their other hand upon which virtual trackpad 310 is projected, thereby providing physical feedback to the user, the cursor, such as cursor 302, is moved in the user interface of the XR device and direction of movement of the user's finger indicated with box 360 shows the direction of movement of cursor 302 with the end point of the user's finger represented by dot 320. As the index finger is moved, and dot 320 moves in the user interface towards a dot such as dot 321, the user is able to move a cursor towards an item in the user interface of the virtual environment that can be selected by the user. In some embodiments, the selection can be made by the user hold the position of the cursor over an item for a predetermined period of time (e.g., 1 second, 2 seconds, 1-5 second range, etc.).

Figure 4A:
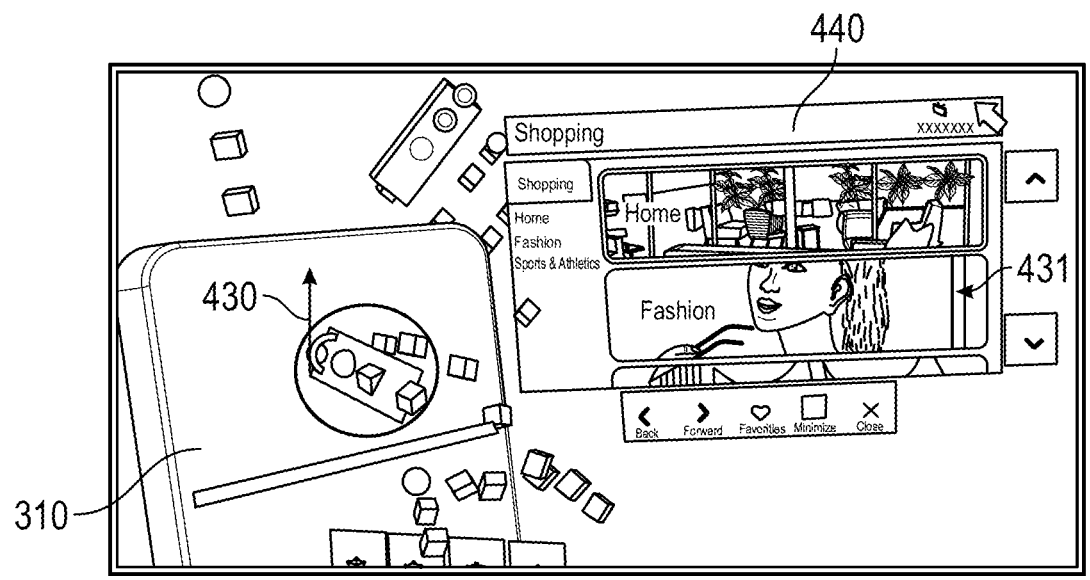
FIGS. 4A-4D illustrate more detailed illustration of the use of the virtual trackpad.
Figure 4B:
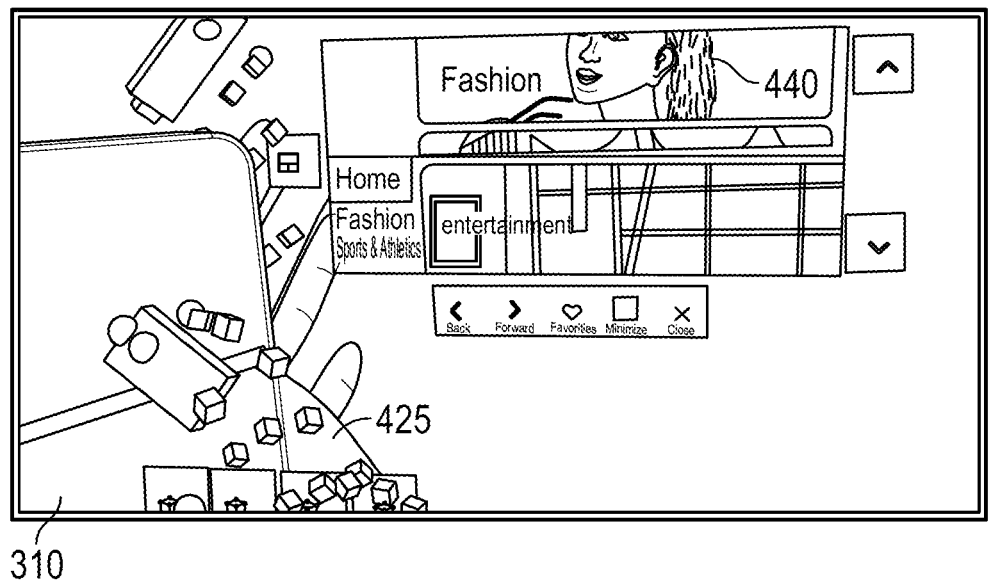

FIGS. 4A-4D illustrate more detailed illustration of the use of the virtual trackpad. Referring to FIGS. 4A and 4B, the XR device can detect each finger, such as an index finger and middle finger, across the projected trackpad using hand tracking and translate those movements into commands that the XR device can execute to control the user interface in the virtual environment generated by the XR device.

FIGS. 4A and 4B illustrates the user swiping two fingers across a virtual trackpad to cause a scrolling operation to occur in the user interface. When the user swipes up and down with two fingers, such as an index finger and a middle finger, across the virtual trackpad 310 projected on their other hand, the XR device captures those movements with hand tracking sensors (e.g., cameras) and translates the captured hand tracking position data into scroll commands. When the XR device executes the scroll commands, the 2D window that is displayed on the user interface of the XR device can be scrolled. Thus, the two fingers swiped across the virtual trackpad 310 are detected by the XR device and causes the display in a 2D window of the XR user interface to scroll up (FIG. 4A) and/or down (FIG. 4B). For example, if the user swipes up with the two fingers as indicated by arrow 430, the XR device scrolls window 440 upward as indicated by arrow 431, and if the user swipes down with the two fingers, the XR device scrolls window 440 downward.

Figure 4C:
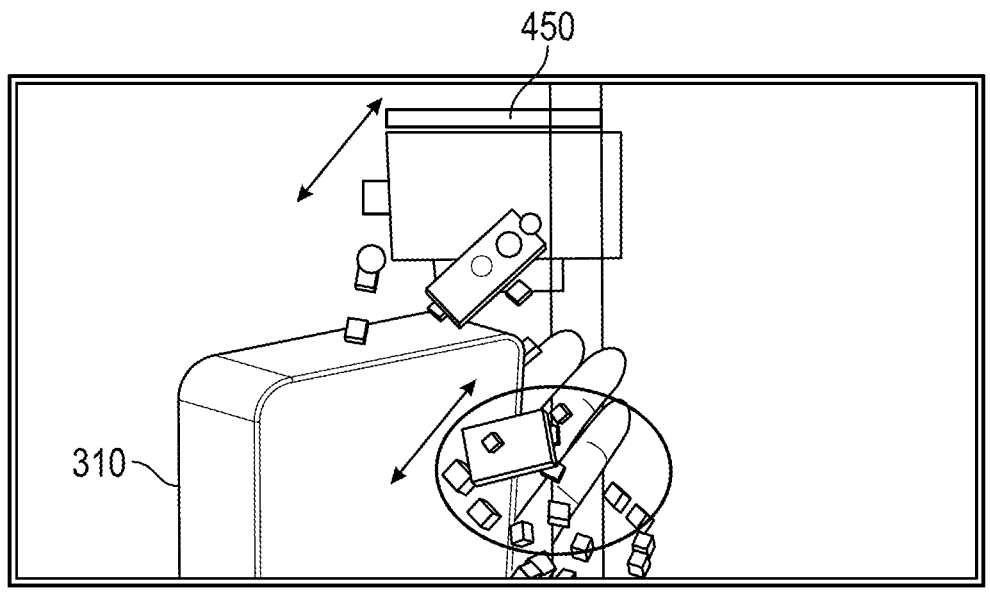
Figure 4D:
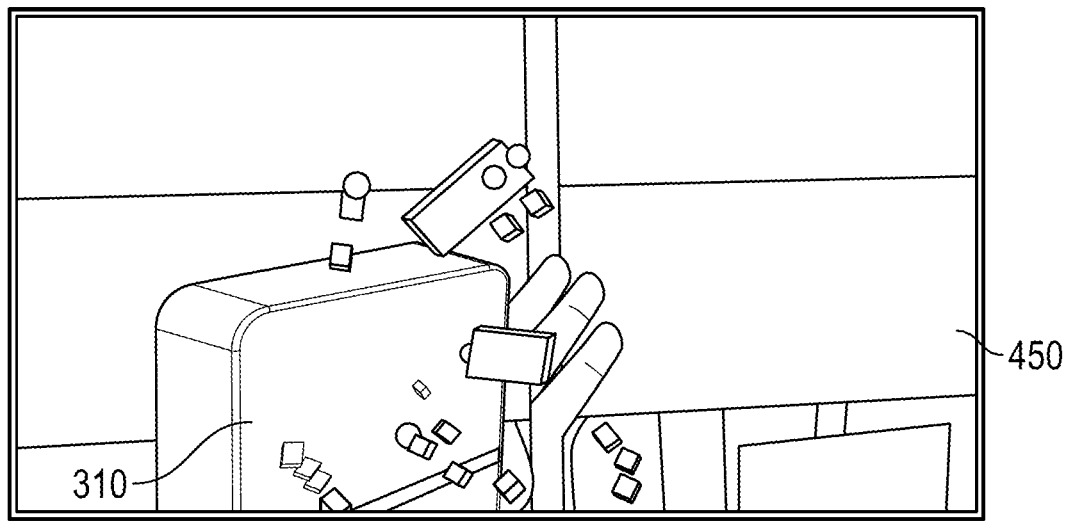

Similarly, when the users pinch two fingers, such as for example, their thumb and index finger, in and out, they can control the scale of a 2D window. For example, in FIGS. 4C and 4D, the thumb and index finger are pinched in and out against their other hand and the trackpad 310 projected thereon, which results in the scaling of a 2D window being display in the user interface of the XR device to change size of the 2D window. When the user makes the pinching motion, the XR device performs hand tracking to obtain the tracking position data for the two fingers and converts that into commands, which when executed by the XR device, cause the XR device to change the size of the 2D window. For example, as shown in FIG. 4C, as the distance between the two fingers is reduced (e.g., to 0.01554891 inches), the XR device reduces window 450 is size; however, as shown in FIG. 4D, as the distance between the two fingers is increased (e.g., expanded to 0.1428908 inches), the XR device increase the size of window 450.

Figure 5:
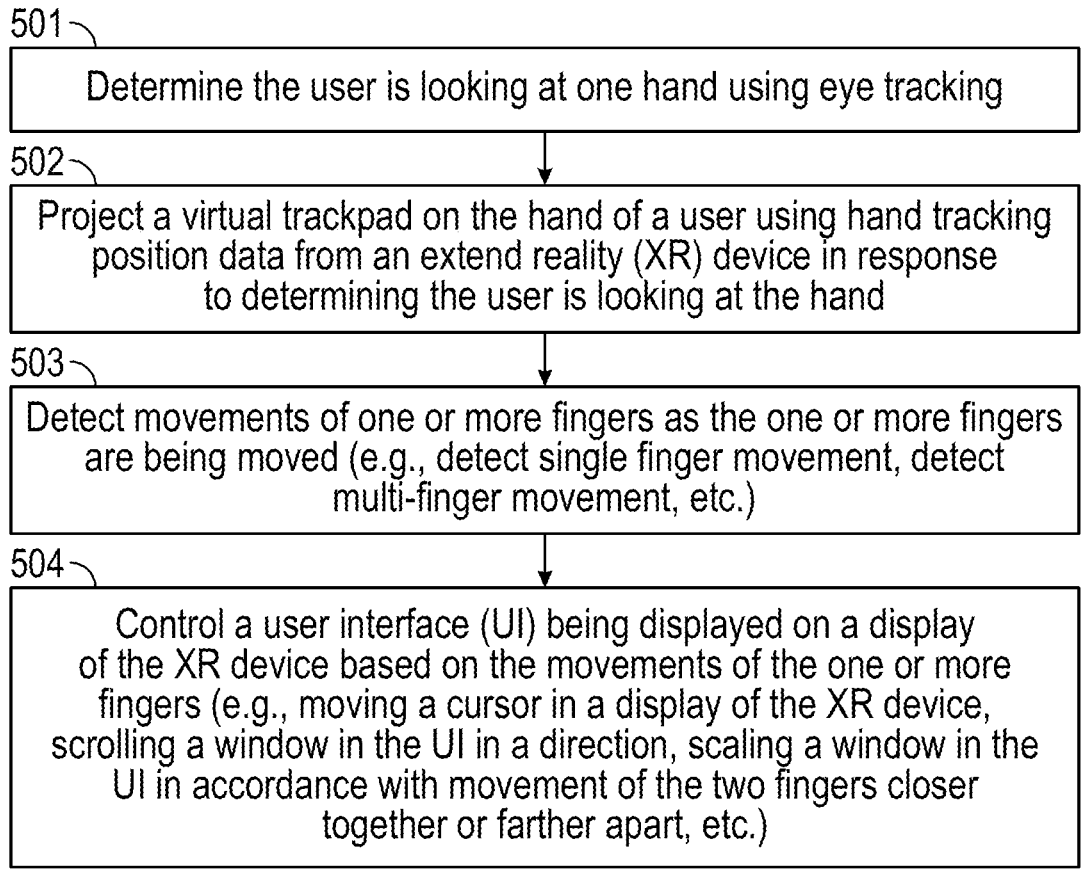
FIG. 5 is a data flow diagram of some embodiments of a process for using an extended reality (XR) virtual trackpad to control a user interface being displayed by an XR device.

FIG. 5 is a data flow diagram of some embodiments of a process for using an extended reality (XR) virtual trackpad to control a user interface being displayed by an XR device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 5, the process begins with processing logic determining that the user is looking at one of their hands (processing block 501). In some embodiments, the XR device uses using eye tracking to determine where the user is looking. The eye tracking processing logic of the XR device obtains data that is processed using a recognition routine to determine that the user is looking at their hand.

In response to determining the user is looking at one of their hands, processing logic projects a virtual trackpad on the hand of the user in the user interface (processing block 502). In some embodiments, processing logic projects a virtual trackpad on the hand of the user using hand tracking position data from the XR device. Note that in some other embodiments, the XR device projects the virtual trackpad on another surface instead of a user's hand. For example, the XR device projects the virtual trackpad on something being held by a user's hand (e.g., a flat surface), near the user (e.g., a wall), or on another body part of the user.

After projecting the virtual trackpad, processing logic detects movements of one or more fingers as the one or more fingers on the hand are being moved (processing block 503). In some embodiments, the processing logic detects a single finger movement. In some other embodiments, processing logic detects a multi-finger movement (e.g., two finger movement, thumb and finger movement, etc.).

In response to detecting movements of one or more fingers, processing logic controls the user interface being displayed on a display in a virtual environment generated by the XR device (processing block 504). In some embodiments, processing logic controls the user interface being displayed in the virtual environment according to the movement data obtained by hand tracking the movements of the one or more fingers with respect to the virtual trackpad. For example, the hand tracking performed by the XR device determines the direction and distance that the one or more fingers have moved over the virtual track pad and translates that distance into commands that the XR device applies to objects (e.g., windows, cursors, etc.) in the virtual environment.

Figure 6:
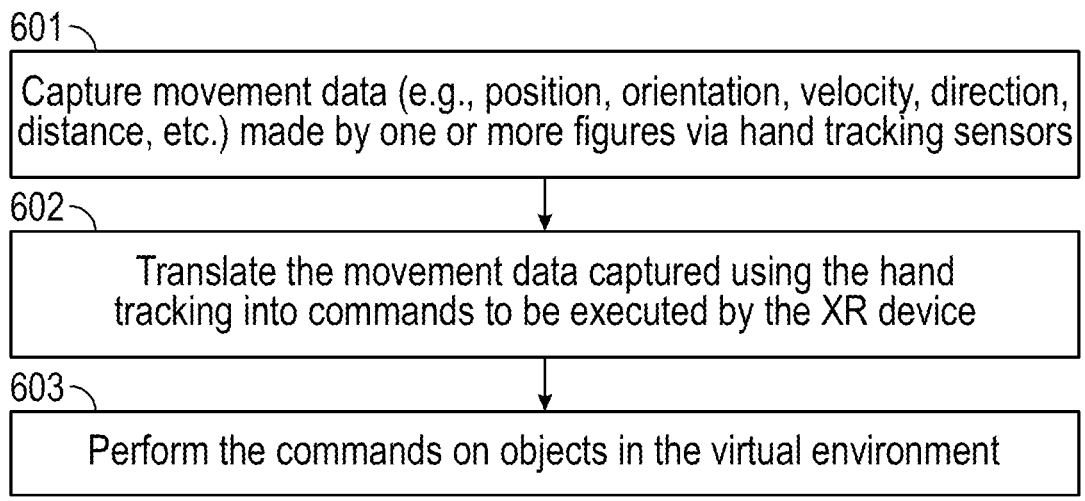
FIG. 6 is a data flow diagram of some embodiments of a process for controlling objects in a user interface in a virtual environment being displayed by an XR device based on movements made with respect to an XR virtual trackpad being projected on a user's hand.

FIG. 6 is a data flow diagram of some embodiments of a process for controlling objects in a user interface in a virtual environment being displayed by an XR device based on movements made with respect to an XR virtual trackpad being projected on a user's hand. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. Referring to FIG. 6, the process begins with processing logic capturing movement data made by one or more figures, including one or more of position, orientation, velocity, direction, distance, etc. (processing block 601), translates the movement data captured using the hand tracking into commands to be executed by the XR device (processing block 602), and performing the commands on objects in the virtual environment (processing block 603). In this way, the movements of one or more fingers of a user with respect to a virtual trackpad being projected on their hand controls a user interface in a virtual environment generated by the XR device.

Referring back to FIG. 5, in some embodiments, controlling the user interface comprises moving a cursor in the user interface displayed by the XR device. For example, the XR device can move a cursor in a user interface in a virtual environment according to the movements with a finger (e.g., index finger, fore finger, etc.) on the virtual trackpad that are captured via hand tracking and converted into commands executed by the XR device. In some embodiments, the XR device can move the cursor toward a collision detection area. In some embodiments, if a user stop their movement of their finger across the virtual trackpad at a collision detection area for a predetermined period of time (e.g., 1 second, 2 second, a range of 1-5 seconds, etc.), the user is able to make a selection (e.g., a menu item selection, object selection, etc.) in the virtual environment.

In some other embodiments, controlling the user interface comprises scrolling a window in the user interface in the direction of the movement of the one or more fingers. For example, the XR device can scroll a 2D window in a user interface in a virtual environment according to the movements with two fingers (e.g., a thumb and index finger, etc.) on the virtual trackpad that are captured via hand tracking and converted into commands executed by the XR device. In some embodiments, the XR device can scroll the 2D window by swiping the two fingers up and down.

In yet some other embodiments, controlling the user interface comprises scaling a window in the user interface in accordance with the movement of one or more fingers. For example, the XR device performs scaling of an object (e.g., a window) in the virtual environment in response the user moving two fingers closer together like a pinching motion or farther apart like the opposite of a pinching motion (i.e. a reverse pinching motion). In some embodiments, moving two fingers closer together (a pinching motion) is captured via hand tracking, converted into commands that the XR device executes, resulting in the XR device reducing the size of an object, while moving two fingers farther apart like a reverse pinching motion is captured via hand tracking, converted into commands that the XR device executes, resulting in the XR device increasing the size of an object.

There are a number of example embodiments described herein.

Example 1 is a method comprising: projecting a virtual trackpad on one hand of a user using hand tracking position data from an extend reality (XR) device; detecting, via hand tracking, movements of one or more fingers as the one or more fingers are being moved across the virtual trackpad projected on the one hand; and controlling a user interface (UI) being displayed on a display by the XR device based on the movements of the one or more fingers.

Example 2 is the method of example 1 that may optionally include that detecting movements of one or more fingers comprises detecting movement of a single finger of a user, and wherein controlling the user interface comprises moving a cursor in a user interface being displayed in a virtual environment generated by the XR device in accordance with the movement of the single finger.

Example 3 is the method of example 1 that may optionally include that the single finger is an index finger.

Example 4 is the method of example 1 that may optionally include that detecting movements of one or more fingers comprises detecting a two-finger movement of the user with respect to the virtual trackpad.

Example 5 is the method of example 4 that may optionally include that the two-finger movement of the user comprises a swiping movement in which two fingers are swiped across the virtual trackpad, and wherein controlling the user interface comprises scrolling a window in the UI in a direction indicated by direction of the swiping movement.

Example 6 is the method of example 5 that may optionally include that the two-finger movement of the user comprises a movement of two fingers closer together or farther apart, and wherein controlling the user interface comprises scaling an object in the UI in accordance with movement of the two fingers closer together or farther apart.

Example 7 is the method of example 5 that may optionally include determining the user is looking at the one hand using image recognition and hand tracking, wherein projecting a virtual trackpad on one hand occurs in response to determining the user is looking at the one hand.

Example 8 is the method of example 1 that may optionally include that detecting movements of the one or more fingers comprises capturing data on the position, orientation, and velocity of the one or more fingers.

Example 9 is the method of example 1 that may optionally include determining a gesture associated with movements of the one or more fingers based on hand tracking data generated from the hand tracking, and wherein controlling a user interface (UI) being displayed on a display by the XR device based on the movements of the one or more fingers comprises controlling a user interface (UI) being displayed on a display by the XR device based on the movements of the gesture.

Example 10 is a computing system for controlling a user interface, the computing system comprising: one or more processors; and one or more memories storing instructions that, when executed by the one or more processors, cause the computing system to perform a process comprising: projecting a virtual trackpad on one hand of a user using hand tracking position data from an extend reality (XR) device; detecting, via hand tracking, movements of one or more fingers as the one or more fingers are being moved across the virtual trackpad projected on the one hand; and controlling a user interface (UI) being displayed on a display by the XR device based on the movements of the one or more fingers.

Example 11 is the computing system of example 10 that may optionally include that detecting movements of one or more fingers comprises detecting movement of a single finger of a user, and wherein controlling the user interface comprises moving a cursor in a user interface being displayed in a virtual environment generated by the XR device in accordance with the movement of the single finger.

Example 12 is the computing system of example 11 that may optionally include that the single finger is an index finger.

Example 13 is the computing system of example 10 that may optionally include that detecting movements of one or more fingers comprises detecting a two-finger movement of the user with respect to the virtual trackpad.

Example 14 is the computing system of example 13 that may optionally include that the two-finger movement of the user comprises a swiping movement in which two fingers are swiped across the virtual trackpad, and wherein controlling the user interface comprises scrolling a window in the UI in a direction indicated by direction of the swiping movement.

Example 15 is the computing system of example 14 that may optionally include that the two-finger movement of the user comprises a movement of two fingers closer together or farther apart, and wherein controlling the user interface comprises scaling an object in the UI in accordance with movement of the two fingers closer together or farther apart.

Example 16 is the computing system of example 14 that may optionally include that the process further comprises determining the user is looking at the one hand using image recognition and hand tracking, wherein projecting a virtual trackpad on one hand occurs in response to determining the user is looking at the one hand.

Example 17 is the computing system of example 10 that may optionally include that the process further comprises determining a gesture associated with movements of the one or more fingers based on hand tracking data generated from the hand tracking, and wherein controlling a user interface (UI) being displayed on a display by the XR device based on the movements of the one or more fingers comprises controlling a user interface (UI) being displayed on a display by the XR device based on the movements of the gesture.

Example 18 is one or more non-transitory computer readable storage media having instructions stored thereupon which, when executed by a system having at least a processor and a memory therein, cause the system to perform operations comprising: projecting a virtual trackpad on one hand of a user using hand tracking position data from an extend reality (XR) device; detecting, via hand tracking, movements of one or more fingers as the one or more fingers are being moved across the virtual trackpad projected on the one hand; and controlling a user interface (UI) being displayed on a display by the XR device based on the movements of the one or more fingers.

Example 19 is the one or more non-transitory computer readable storage media of example 18 that may optionally include that detecting movements of one or more fingers comprises detecting movement of a single finger of a user, and wherein controlling the user interface comprises moving a cursor in a user interface being displayed in a virtual environment generated by the XR device in accordance with the movement of the single finger.

Example 20 is the one or more non-transitory computer readable storage media of example 18 that may optionally include that detecting movements of one or more fingers comprises detecting a two-finger movement of the user with respect to the virtual trackpad, the two-finger movement of the user being a swiping movement in which two fingers are swiped across the virtual trackpad, and wherein controlling the user interface comprises scrolling a window in the UI in a direction indicated by direction of the swiping movement.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method comprising:
   determining the user is looking at the one hand using image recognition and hand tracking;
   generating a digital model of the one hand by converting captured data on position, orientation, and velocity of the one hand in response to determining the user is looking at the one hand;
   identifying a position on the one hand from the digital model;
   projecting a virtual trackpad at the position on the one hand of a user using hand tracking position data from an extend reality (XR) device in response to determining the user is looking at the one hand;
   detecting, via hand tracking, movements of one or more fingers as the one or more fingers are being moved across the virtual trackpad projected on the one hand; and
   controlling a user interface (UI) being displayed on a display by the XR device based on the movements of the one or more fingers.

2. The method of claim 1 wherein detecting movements of one or more fingers comprises detecting movement of a single finger of a user, and wherein controlling the user interface comprises moving a cursor in a user interface being displayed in a virtual environment generated by the XR device in accordance with the movement of the single finger.

3. The method of claim 2 wherein the single finger is an index finger.

4. The method of claim 1 wherein detecting movements of one or more fingers comprises detecting a two-finger movement of the user with respect to the virtual trackpad.

5. The method of claim 4 wherein the two-finger movement of the user comprises a swiping movement in which two fingers are swiped across the virtual trackpad, and wherein controlling the user interface comprises scrolling a window in the UI in a direction indicated by direction of the swiping movement.

6. The method of claim 5 wherein the two-finger movement of the user comprises a movement of two fingers closer together or farther apart, and wherein controlling the user interface comprises scaling an object in the UI in accordance with movement of the two fingers closer together or farther apart.

7. The method of claim 1 wherein detecting movements of the one or more fingers comprises capturing data on the position, orientation, and velocity of the one or more fingers.

8. The method of claim 1 further comprising determining a gesture associated with movements of the one or more fingers based on hand tracking data generated from the hand tracking, and wherein controlling a user interface (UI) being displayed on a display by the XR device based on the movements of the one or more fingers comprises controlling a user interface (UI) being displayed on a display by the XR device based on the movements of the gesture.

9. A computing system for controlling a user interface, the computing system comprising:
   one or more processors; and
   one or more memories storing instructions that, when executed by the one or more processors, cause the computing system to perform a process comprising:
      determining the user is looking at the one hand using image recognition and hand tracking;
      generating a digital model of the one hand by converting captured data on position, orientation, and velocity of the one hand in response to determining the user is looking at the one hand;
      identifying a position on the one hand from the digital model;
      projecting a virtual trackpad at the position on the one hand of a user using hand tracking position data from an extend reality (XR) device in response to determining the user is looking at the one hand;
      detecting, via hand tracking, movements of one or more fingers as the one or more fingers are being moved across the virtual trackpad projected on the one hand; and
      controlling a user interface (UI) being displayed on a display by the XR device based on the movements of the one or more fingers.

10. The computing system of claim 9 wherein detecting movements of one or more fingers comprises detecting movement of a single finger of a user, and wherein controlling the user interface comprises moving a cursor in a user interface being displayed in a virtual environment generated by the XR device in accordance with the movement of the single finger.

11. The computing system of claim 10 wherein the single finger is an index finger.

12. The computing system of claim 9 wherein detecting movements of one or more fingers comprises detecting a two-finger movement of the user with respect to the virtual trackpad.

13. The computing system of claim 12 wherein the two-finger movement of the user comprises a swiping movement in which two fingers are swiped across the virtual trackpad, and wherein controlling the user interface comprises scrolling a window in the UI in a direction indicated by direction of the swiping movement.

14. The computing system of claim 13 wherein the two-finger movement of the user comprises a movement of two fingers closer together or farther apart, and wherein controlling the user interface comprises scaling an object in the UI in accordance with movement of the two fingers closer together or farther apart.

15. The computing system of claim 9 wherein the process further comprises determining a gesture associated with movements of the one or more fingers based on hand tracking data generated from the hand tracking, and wherein controlling a user interface (UI) being displayed on a display by the XR device based on the movements of the one or more fingers comprises controlling a user interface (UI) being displayed on a display by the XR device based on the movements of the gesture.

16. One or more non-transitory computer readable storage media having instructions stored thereupon which, when executed by a system having at least a processor and a memory therein, cause the system to perform operations comprising:
   determining the user is looking at the one hand using image recognition and hand tracking;
   generating a digital model of the one hand by converting captured data on position, orientation, and velocity of the one hand in response to determining the user is looking at the one hand;
   identifying a position on the one hand from the digital model;
   projecting a virtual trackpad at the position on the one hand of a user using hand tracking position data from an extend reality (XR) device in response to determining the user is looking at the one hand;
   detecting, via hand tracking, movements of one or more fingers as the one or more fingers are being moved across the virtual trackpad projected on the one hand; and
   controlling a user interface (UI) being displayed on a display by the XR device based on the movements of the one or more fingers.

17. The one or more non-transitory computer readable storage media of claim 16 wherein detecting movements of one or more fingers comprises detecting movement of a single finger of a user, and wherein controlling the user interface comprises moving a cursor in a user interface being displayed in a virtual environment generated by the XR device in accordance with the movement of the single finger.

18. The one or more non-transitory computer readable storage media of claim 16 wherein detecting movements of one or more fingers comprises detecting a two-finger movement of the user with respect to the virtual trackpad, the two-finger movement of the user being a swiping movement in which two fingers are swiped across the virtual trackpad, and wherein controlling the user interface comprises scrolling a window in the UI in a direction indicated by direction of the swiping movement.

19. The method of claim 1 further comprising:
   displaying one or more virtual objects in the virtual environment that indicates direction of movement of at least one finger of the two or more fingers of the user as the at least one finger moves across the virtual trackpad, each of the one or more virtual objects having an indicator that indicates an end point of the at least one finger that moves in the user interface as the at least one finger moves across in the virtual trackpad; and
   displaying at least one collision detection area in the user interface that indicates a location in the user interface where the user is able to select an item displayed in the user interface with the cursor.

20. The method of claim 1 wherein the direction of the movement is represented by a first object having a first shape and the indicator representing the end point of the at least one finger is represented by a second object having a second shape different than the first shape.

* * * * *